S. H. RAYMOND.
MACHINE FOR UPSETTING TIRES.

No. 266,313.  Patented Oct. 24, 1882.

Witnesses:
Cyrus E. Perkins
Adolph B. Mason

Inventor:
Silas H. Raymond

United States Patent Office.

SILAS H. RAYMOND, OF GRAND RAPIDS, MICHIGAN, ASSIGNOR TO CHARLES H. SOUTHWICK, OF SAME PLACE.

MACHINE FOR UPSETTING TIRES.

SPECIFICATION forming part of Letters Patent No. 266,313, dated October 24, 1882.

Application filed January 17, 1880.

*To all whom it may concern:*

Be it known that I, SILAS H. RAYMOND, of the city of Grand Rapids, in the county of Kent and State of Michigan, have invented a new and useful Tire-Upsetting Machine, (for which I have never obtained a patent in this or any other country,) of which the following is a specification.

My invention relates to improvements in tire-upsetting machines in which the tire is held by eccentrics; and the object of my invention is to provide a machine with two eccentrics so arranged as to hold the tire without the aid of levers or springs, the eccentrics moving at right angles with the tire. I attain this object by the mechanism illustrated in the accompanying drawings, in which—

Figure 1:
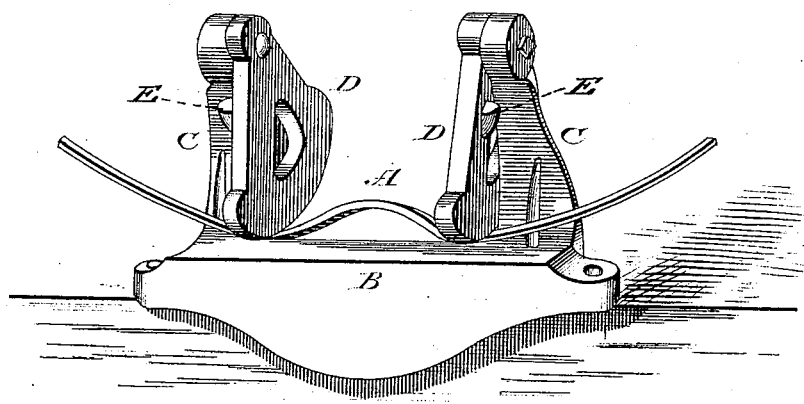
Figure 2:

Figure 1 is a perspective view of the machine complete, with a tire in position to be upset; and Fig. 2 is one of the eccentrics detached from the machine, showing the form of the lower part of the eccentrics, which form, however, may be varied.

Similar letters refer to similar parts throughout the several views.

The machine is composed of the bed-piece B, two upright posts, C C, and two eccentrics, D D. The bed-piece B and posts C C may be cast in one piece, as shown in the drawings. The eccentrics are each attached by a bolt, on which they turn, to the upper end of the posts C C, and have a motion at right angles with the tire and bed-piece B. Attached to or integral with each eccentric is a lug, E, as shown. When a tire is being placed in position on the bed of the machine the eccentrics D D are turned back, so that their lugs E will rest upon or against the backs of the posts C C, thus leaving the bed free and permitting the tire to be readily adjusted.

The operation of my invention is as follows: The tire is bent and placed on the bed-piece B and the eccentrics brought down upon the tire and tightened by a stroke of the hammer. The tire is then hammered down to the bed-piece, and is thus straightened.

I claim—

The eccentrics D D, provided with the lugs or rests E E, in combination with the posts C C and bed-piece B, so constructed and arranged that the movement of the eccentrics is at right angles with the bed-piece and tire, substantially as described.

SILAS H. RAYMOND.

In presence of—
CHARLES CHANDLER,
CHARLES SHUSTER.